(12) United States Patent
Kitaguchi et al.

(10) Patent No.: US 10,414,301 B2
(45) Date of Patent: Sep. 17, 2019

(54) COOLING STRUCTURE FOR VEHICLE HIGH-VOLTAGE ELECTRIC PARTS

(75) Inventors: Asami Kitaguchi, Saitama (JP); Nobukazu Kikuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1264 days.

(21) Appl. No.: 13/388,905

(22) PCT Filed: Jun. 3, 2010

(86) PCT No.: PCT/JP2010/059480
§ 371 (c)(1),
(2), (4) Date: Feb. 3, 2012

(87) PCT Pub. No.: WO2011/016284
PCT Pub. Date: Feb. 10, 2011

(65) Prior Publication Data
US 2012/0129440 A1 May 24, 2012

(30) Foreign Application Priority Data
Aug. 3, 2009 (JP) .................................. 2009-180967

(51) Int. Cl.
*B60N 2/56* (2006.01)
*B60K 1/04* (2019.01)
(Continued)

(52) U.S. Cl.
CPC .............. *B60N 2/5621* (2013.01); *B60K 1/04* (2013.01); *B60K 11/06* (2013.01); *B60K 11/08* (2013.01);
(Continued)

(58) Field of Classification Search
CPC ............ B60H 1/00021; B60H 1/00028; B60H 1/00271; B60H 1/00278; B60H 1/00285;
(Continued)

(56) References Cited

U.S. PATENT DOCUMENTS 5,918,930 A * 7/1999 Kawai et al. ............ 297/180.13
5,921,605 A * 7/1999 Musukula et al. ............... 296/63
(Continued)

FOREIGN PATENT DOCUMENTS

CN 2269126 Y 12/1997
CN 1180628 A 5/1998
(Continued)

OTHER PUBLICATIONS

Machine English Translation of JP2008092696A, Taguchi, Apr. 2008.*
(Continued)

*Primary Examiner* — Gregory L Huson
*Assistant Examiner* — Dana K Tighe
(74) *Attorney, Agent, or Firm* — Westerman, Hattori, Daniels & Adrian, LLP (57) ABSTRACT

A cooling structure for vehicle high-voltage electric parts includes an air inlet passage 26 having an air inlet port 32 which is disposed higher than a seat cushion 6 of a rear seat 7 so as to supply air from a passenger compartment 9 to a battery unit 21, an inverter unit 22 and a DC-DC converter unit 23 and a cooling fan 30 which causes cooling air to flow into the air inlet passage 26. An opening portion 35 from which air is taken into the air inlet passage 26 is formed inside a side seatback 4 which is placed transversely outward of a main seatback 5 of the rear seat 7.

17 Claims, 12 Drawing Sheets

(51) Int. Cl.
- *B60K 11/06* (2006.01)
- *B60K 11/08* (2006.01)
- *B60N 2/58* (2006.01)
- *H01M 10/625* (2014.01)
- *H01M 10/663* (2014.01)
- *H01M 10/6563* (2014.01)
- *H01M 10/6556* (2014.01)
- *H01M 10/613* (2014.01)
- *B60N 2/90* (2018.01)
- *B60L 50/50* (2019.01)
- *B60L 58/26* (2019.01)
- *B60L 50/60* (2019.01)
- *B60K 1/00* (2006.01)

(52) U.S. Cl.
CPC ............... *B60L 50/50* (2019.02); *B60L 50/66* (2019.02); *B60L 58/26* (2019.02); *B60N 2/58* (2013.01); *B60N 2/986* (2018.02); *H01M 10/613* (2015.04); *H01M 10/625* (2015.04); *H01M 10/6556* (2015.04); *H01M 10/6563* (2015.04); *H01M 10/663* (2015.04); *B60K 2001/005* (2013.01); *B60K 2001/0416* (2013.01); *B60L 2200/26* (2013.01); *B60L 2210/10* (2013.01); *Y02T 10/7005* (2013.01); *Y02T 10/705* (2013.01); *Y02T 10/7216* (2013.01)

(58) Field of Classification Search
CPC ............ B60H 1/00207; B60H 1/00507; B60H 1/00535; B60H 1/00564; B60H 2001/00614; B60N 2/56; B60N 2/5816; B60N 2/688
USPC ... 454/69, 99, 100, 107, 108, 109, 112, 115, 454/117, 120, 139, 143, 145, 146; 296/63, 67, 69, 208
See application file for complete search history.

(56) References Cited

U.S. PATENT DOCUMENTS

| | | | |
|---|---|---|---|
| 2008/0296075 A1* | 12/2008 | Zhu et al. | 180/68.1 |
| 2008/0297136 A1* | 12/2008 | Gaboury et al. | 324/76.11 |

FOREIGN PATENT DOCUMENTS

| | | | | |
|---|---|---|---|---|
| CN | 2863545 Y | 1/2007 | | |
| CN | 201205876 Y | 3/2009 | | |
| EP | 2 062 769 A1 | 5/2009 | | |
| JP | 59-162054 U | 10/1984 | | |
| JP | 61-159209 U | 10/1986 | | |
| JP | 2001-233064 A | 8/2001 | | |
| JP | 2004-001683 A | 1/2004 | | |
| JP | 2004-345451 A | 12/2004 | | |
| JP | 2005-071759 A | 3/2005 | | |
| JP | 2006-130989 A | 5/2006 | | |
| JP | 2006-188182 A | 7/2006 | | |
| JP | 2006-335244 A | 12/2006 | | |
| JP | 2006-339048 A | 12/2006 | | |
| JP | 2007-331689 A | 12/2007 | | |
| JP | 2008092696 A | * | 4/2008 | ............ B60L 11/18 |
| JP | 4114478 B2 | 7/2008 | | |
| WO | 2009/081764 A1 | 7/2009 | | |

OTHER PUBLICATIONS

Russian Office Action dated Mar. 12, 2013, issued in corresponding Russian Patent Application No. 2012108122, with English translation (5 pages).
International Search Report of PCT/JP2010/059480, dated Jul. 13, 2010.
Office Action dated Jan. 4, 2016, issued in counterpart Chinese Patent Application No. 201410359546.6. (5 pages).
The Torque Report, 2010 Toyota Prius Officially Rated with a 50MPG Combined Rating, Mar. 5, 2009, http://www.thetorquereport.com/2009/03/2010_toyota_prius_officially_r.html.
Non-Final Office Action dated Jul. 19, 2017, issued in U.S. Appl. No. 14/309,175. (29 pages).

* cited by examiner

COOLING STRUCTURE FOR VEHICLE HIGH-VOLTAGE ELECTRIC PARTS

TECHNICAL FIELD

The present invention relates to a cooling structure for vehicle high-voltage electric parts which is effective in taking in cooling air for cooling high-voltage electric parts used in an electric vehicle or a hybrid vehicle.

BACKGROUND ART

For example, in a hybrid vehicle, high-voltage electric parts are installed behind a seatback of a rear seat, within a luggage compartment or underneath the luggage compartment. The high-voltage electric parts include a battery as a driving energy source. Since the battery is a heat generating part which generates heat when charged or discharged, the battery needs to be cooled to maintain its performance. The battery is desirably cooled efficiently by supplying cooling air taken in to the battery with small air passage resistance. Conventionally, for example, air inside a passenger compartment of a hybrid vehicle is taken in from a position near a rear seat and adjacent to a battery by a cooling fan, and is supplied to the battery as cooling air (e.g., Patent Literature 1).

Figure 12:
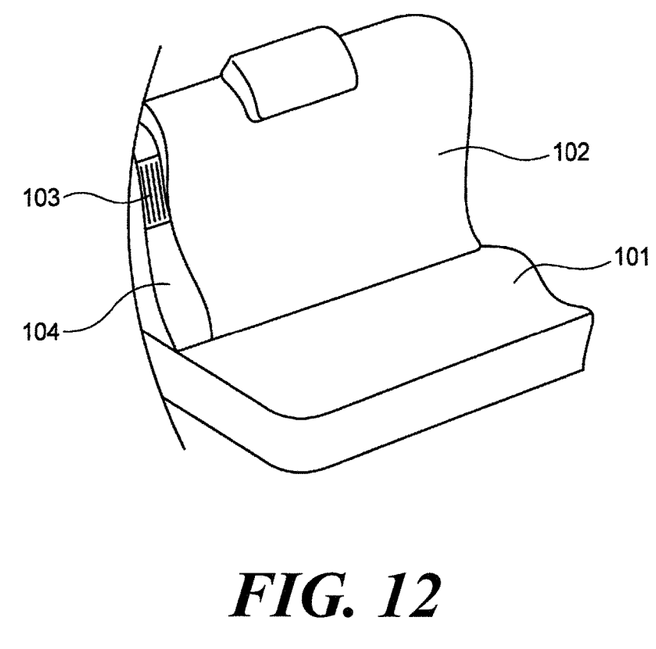
FIG. 12 is a partly perspective view of a rear seat of a motor vehicle according to a conventional example which is seen from a passenger compartment.

FIG. 12 is a perspective view showing an air inlet port of a battery cooling system in Patent Literature 1. In this structure, an air inlet side passage and an air outlet passage are provided, respectively, at an upstream side and a downstream side of a cooling air passage for a battery pack installed in a luggage space behind a rear seat 101 so as to supply air inside a passenger compartment to the battery pack as cooling air. A cooling fan is provided at an intermediate portion along the length of the inlet side passage. The air inlet port 13 of the air inlet side passage is opened in an upper portion of a seat side garnish 104 disposed to a side of a seat back 102 of the rear seat 101, so that air inside the passenger compartment is taken in from the air inlet port 103.

RELATED ART LITERATURE

Patent Literature

Patent Literature 1: JP-4114478-B

SUMMARY OF THE INVENTION

Problem that the Invention is to Solve

In the battery cooling structure in Patent Literature 1, the air inlet port 103 is disposed in the seat side garnish 104 which is provided at the side of the rear seat 101. Therefore, the width of the rear seat 101 may be reduced by the seat side garnish 104. Further, in a vehicle like a small-sized vehicle having no seat side garnish, air inlet port 103 could not be disposed, and hence, it could be further improved.

The invention has been made in view of above, and an object thereof is to provide a cooling structure for vehicle high-voltage electric parts which enables an opening portion from which air inside a passenger compartment is taken into an air inlet passage to be disposed in a rear seat so as not only to ensure a sufficient amount of inlet air but also to avoid a contact with a passenger who gets in and out of the rear seat even in a type of vehicle having no seat side garnish.

Means for Solving the Problem

Claim 1 provides a cooling structure for vehicle high-voltage electric parts (e.g., a battery unit 21, an inverter unit 22 and a DC-DC converter unit 23 in an embodiment) which are disposed behind a rear seat (e.g., a rear seat 7 in the embodiment), including:

an air inlet passage (e.g., an air inlet passage 26 in the embodiment) having an air inlet port (e.g., an air inlet port 32 in the embodiment) which is disposed higher than a seat cushion (e.g., a seat cushion 6 in the embodiment) of the rear seat and communicating with the high-voltage electric parts so as to supply air inside a passenger compartment (e.g., a passenger compartment 9 in the embodiment) to the high-voltage electric parts as cooling air; and a cooling fan (e.g., a cooling fan 30 in the embodiment) which causes the cooling air to flow through the air inlet passage, wherein an opening portion (e.g., an opening portion 35 in the embodiment) for taking in air inside the passenger compartment into the air inlet passage is formed in a side seatback (e.g., a side seatback 4 in the embodiment) which is disposed transversely outward of a main seatback (e.g., a main seatback 5 in the embodiment) of the rear seat.

Claim 2, based on Claim 1, provides the structure,
wherein the opening portion is disposed further transversely outwards than a transversely central position of the side seatback.

Claim 3, based on Claim 1 or 2, provides the structure,
wherein a lower end portion (e.g., a lower end portion 35a in the embodiment) of the opening portion is positioned 30 mm or more higher than an armrest (e.g., an armrest 41 in the embodiment) which is provided on a door lining (e.g., a door lining 40).

Claim 4, based on Claim 1 or 2, provides the structure,
wherein the opening portion is disposed so that at least part thereof is concealed by the armrest when viewed from the front thereof.

Claim 5, based on any of Claims 1 to 4, provides the structure,
wherein the opening portion is covered by a skin (e.g., a skin 34 in the embodiment) of the side seatback which has an air-permeability.

Claim 6, based on any of Claims 1 to 4, provides the structure,
wherein the opening portion is covered by an air inlet grille (e.g., an air inlet grille 37 in the embodiment) having multiple air inlet holes (e.g., air inlet holes 39 in the embodiment).

Claim 7, based on any of Claims 1 to 6, provides the structure,
wherein the side seatback has a cushion material (e.g., a cushion material 52 in the embodiment), so that air inlet noise of the air which is taken in from the opening portion is absorbed by the cushion material.

Claim 8, based on any of Claims 1 to 7, provides the structure,
wherein a space portion (e.g., a space portion 53 in the embodiment) is provided between the air inlet passage and the air inlet port.

Advantage of the Invention

According to Claim 1, the opening portion which introduces air inside the passenger compartment into the air inlet passage can be provided in the side seatback of the rear seat which lies adjacent to the battery, and no seat side garnish has to be provided. Thus, the width of the rear seat can be increased, and air inside the passenger compartment can be taken in sufficiently while obtaining a comfortable space within the passenger compartment which gives a superior ride quality. This configuration is effective particularly for a small-sized vehicle in which it is difficult to ensure a space to provide a seat side garnish. In addition, the contact of the passenger with the opening portion when he or she gets in and out of the vehicle can be avoided by providing the opening portion in the side seatback.

According to Claim 2, the opening portion is not closed by the arm or shoulder of the passenger or the unfastened seatbelt, which ensures that air inside the passenger compartment can be taken in to cool the high-voltage electric parts.

According to Claim 3, neither the elbow of the passenger is brought into abutment with the opening portion, nor the opening portion is closed by the elbow of the passenger. Thus, air inside the passenger compartment can be surely taken in.

According to Claim 4, not only the ingress of dust from the opening portion can be prevented, but also the opening portion can be made inconspicuous by the armrest even when the area of the opening portion is increased so as to reduce the air inlet noise, thereby enhancing the design quality inside the passenger compartment.

According to Claim 5, the side seatback is covered by the same skin in whole, by which the sensation of integration can be provided. Thus, the product quality is enhanced. In addition, the air inlet noise can be reduced by the air-permeable skin, thereby obtaining quietness inside the passenger compartment.

According to Claim 6, the ingress of dust from the opening portion can be prevented.

According to Claim 7, the air inlet noise can be reduced by the cushion material of the side seatback, thereby obtaining quietness inside the passenger compartment.

According to Claim 8, droplets of water condensed inside the air inlet passage can be discharged into the space portion so as to prevent the adhesion of water to the high-voltage electric parts, thereby preventing the high-voltage electric parts to be badly affected by the water. By applying the space portion to a portion where it is difficult to provide an air inlet passage capable of introducing a sufficient amount of air, an air inlet line can be provided within the passenger compartment which is compact in size.

MODE FOR CARRYING OUT THE INVENTION

Hereinafter, embodiments of the invention will be described in detail by reference to the accompanying drawings. The drawings are seen in a direction in which reference numerals given therein look normal.

First Embodiment

Figure 1:
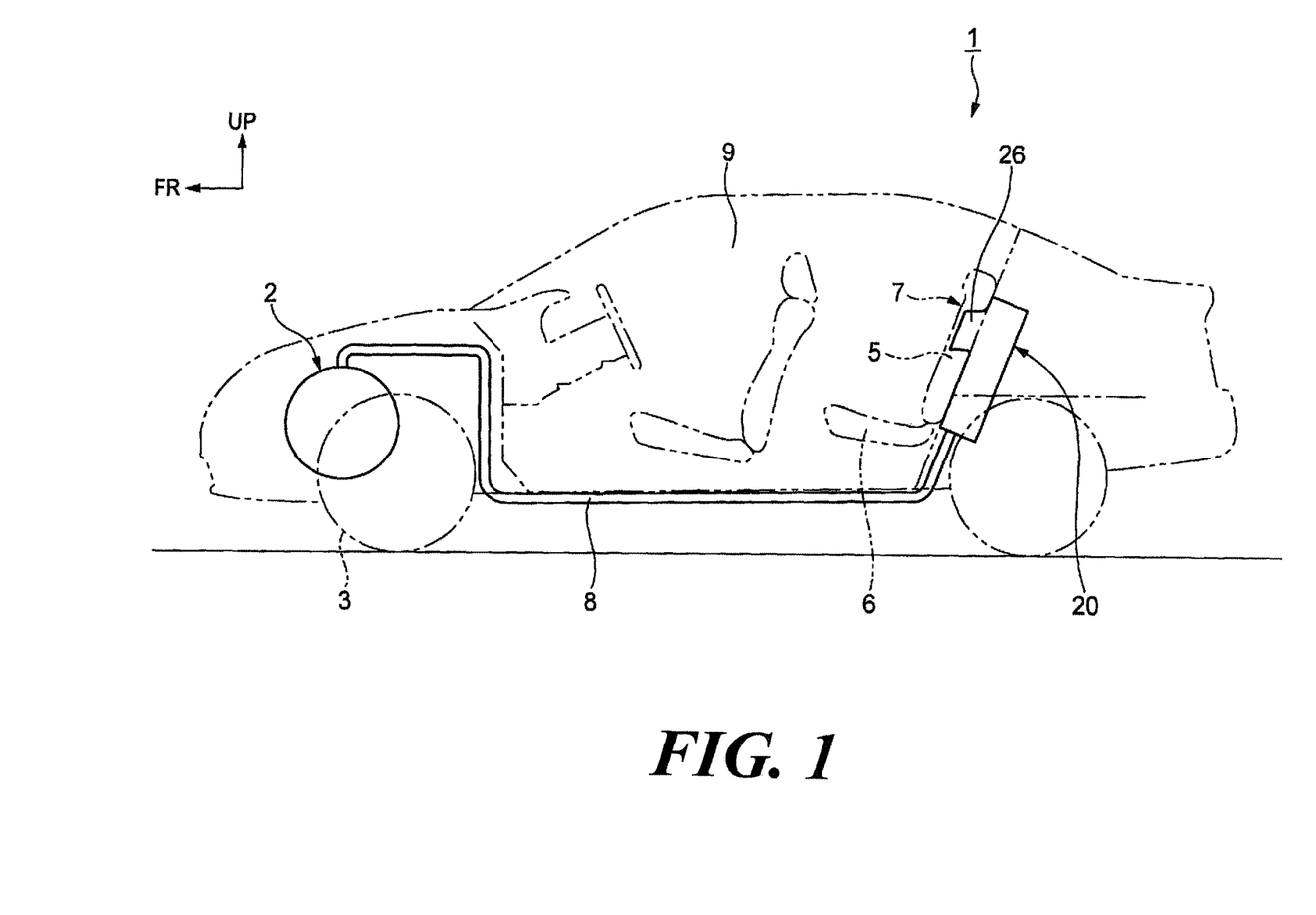
FIG. 1 is a schematic side view of a hybrid vehicle to which a first embodiment of the invention is applied.

As shown in FIG. 1, a vehicle 1 of this embodiment is a hybrid vehicle which includes a power unit 2 including an engine and a motor/generator which are provided in series. The driving of the engine is assisted by the motor/generator, and when the vehicle is decelerated, electric power obtained from the motor/generator is recovered. The motor/generator is a three-phase alternating current motor. Driving force of the engine and the motor/generator is transmitted to front wheels 3 which are drive wheels.

In the vehicle 1, a rear seat 7 includes side seatbacks 4, a main seatback 5 and a seat cushion 6, and an electric parts box 20 is disposed behind the main seatback 5. Electric parts in the electric parts box 20 are connected to the power unit 2 via an electric cable 8.

Figure 2:
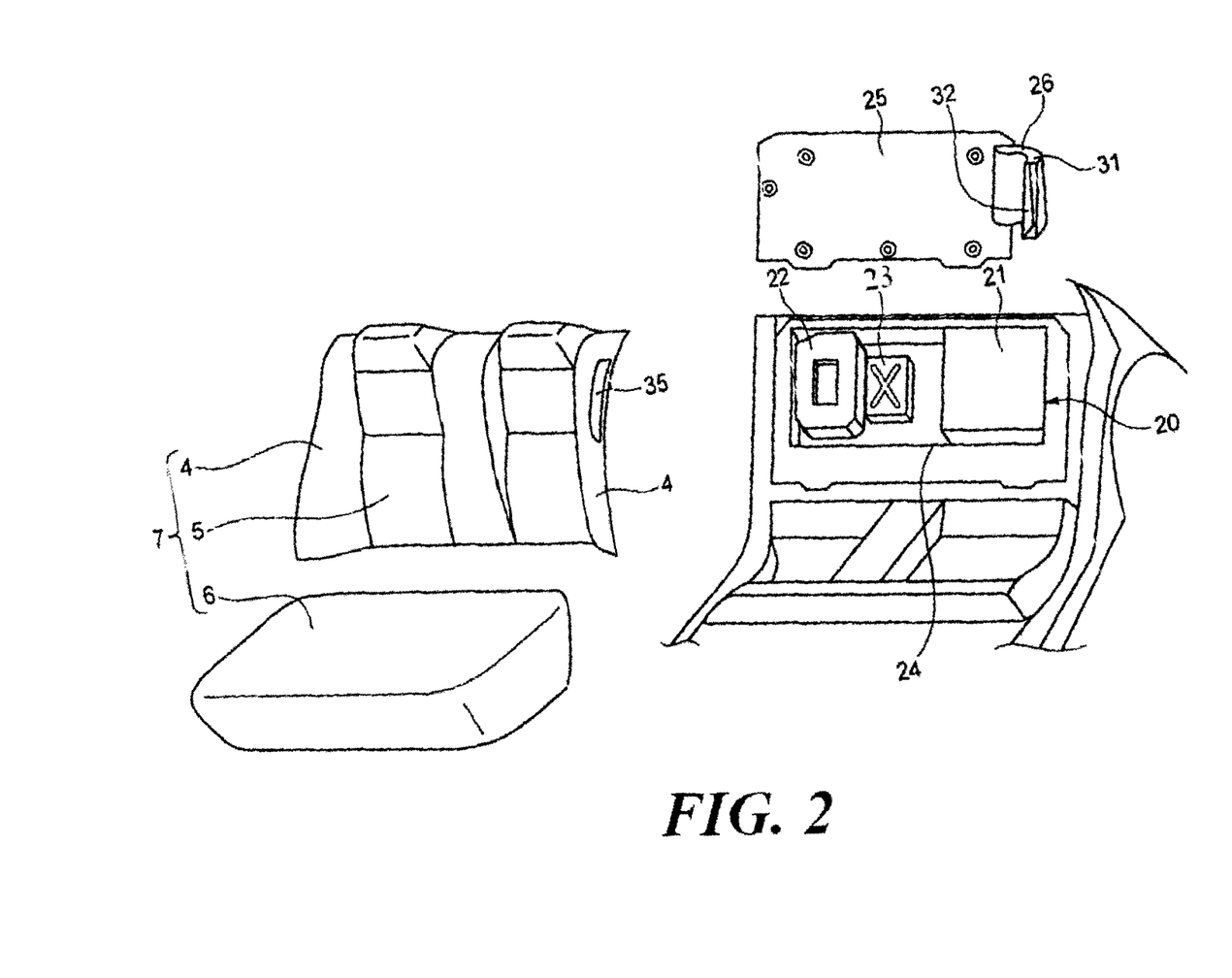
FIG. 2 is an exploded perspective view showing a rear part of the hybrid vehicle shown in FIG. 1.
Figure 3:
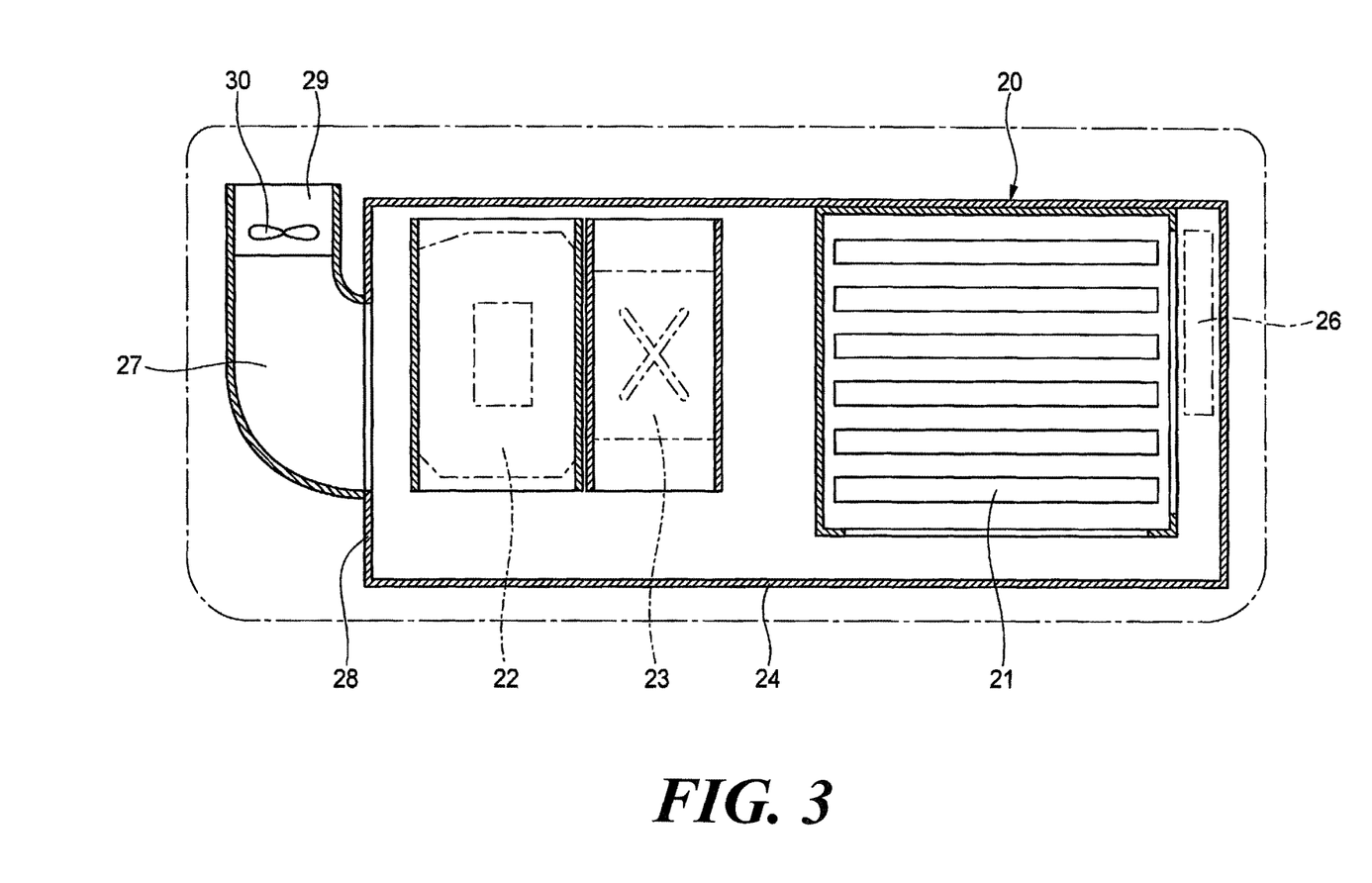
FIG. 3 is a sectional view of a cooling structure for high-voltage electric parts shown in FIG. 2.

As shown in FIGS. 2 and 3, the electric parts box 20 accommodates therein a battery unit 21, an inverter unit 22 and a DC-DC converter unit 23, as high-voltage electric parts. When the motor/generator is fed by the battery unit 21 which is a direct current power supply, a direct current is converted into an alternating current by the inverter unit 22.

When the output of the engine or the kinetic energy of the vehicle 1 is converted into electric energy to be stored in the battery unit 21 at the time of deceleration of the vehicle, the motor/generator functions as a generator to generate a so-called regenerative braking force. Then, an alternating current is converted into a direct current by the inverter unit 22 to be stored into the battery unit 21. Since the voltage of the direct current which is converted by the inverter unit 22 is high, a part thereof is decreased by the DC-DC converter unit 23.

An air inlet passage 26 communicates with the electric parts box 20 which accommodates the battery unit 21, the inverter unit 22 and the DC-DC converter unit 23, so that an interior of the electric parts box 20 is cooled by cooling air which is taken in from a passenger compartment 9 of the vehicle 1.

The electric parts box 20 is an accommodation case 24 having a substantially rectangular parallelepiped box shape which has an open side, and the battery unit 21, the inverter unit 22 and the DC-DC converter unit 23 are accommodated in the accommodation case 24. The electric parts box 20 is disposed behind the main seatback 5 of the rear seat 7 in a state where a cover 25 is screwed to the accommodation case 24 to close the open side thereof.

The air inlet passage 26 is provided integrally at a left-hand side portion (a right-hand side portion in FIG. 2) of the cover 25. An air outlet passage 27 is formed in a right-hand side wall 28 of the accommodation case 24 so as to communicate with an interior of the accommodation case 24. A cooling fan 30 for forcing air out of the accommodation case 24 is mounted in an air outlet port 29 which constitutes an end portion of the air outlet passage 27. Namely, the air inlet passage 26 communicates with an upstream side of a cooling air passage of the electric parts box 20, and the air outlet passage 27 communicates with a downstream side of the cooling air passage of the electric parts box 20.

Figure 4:
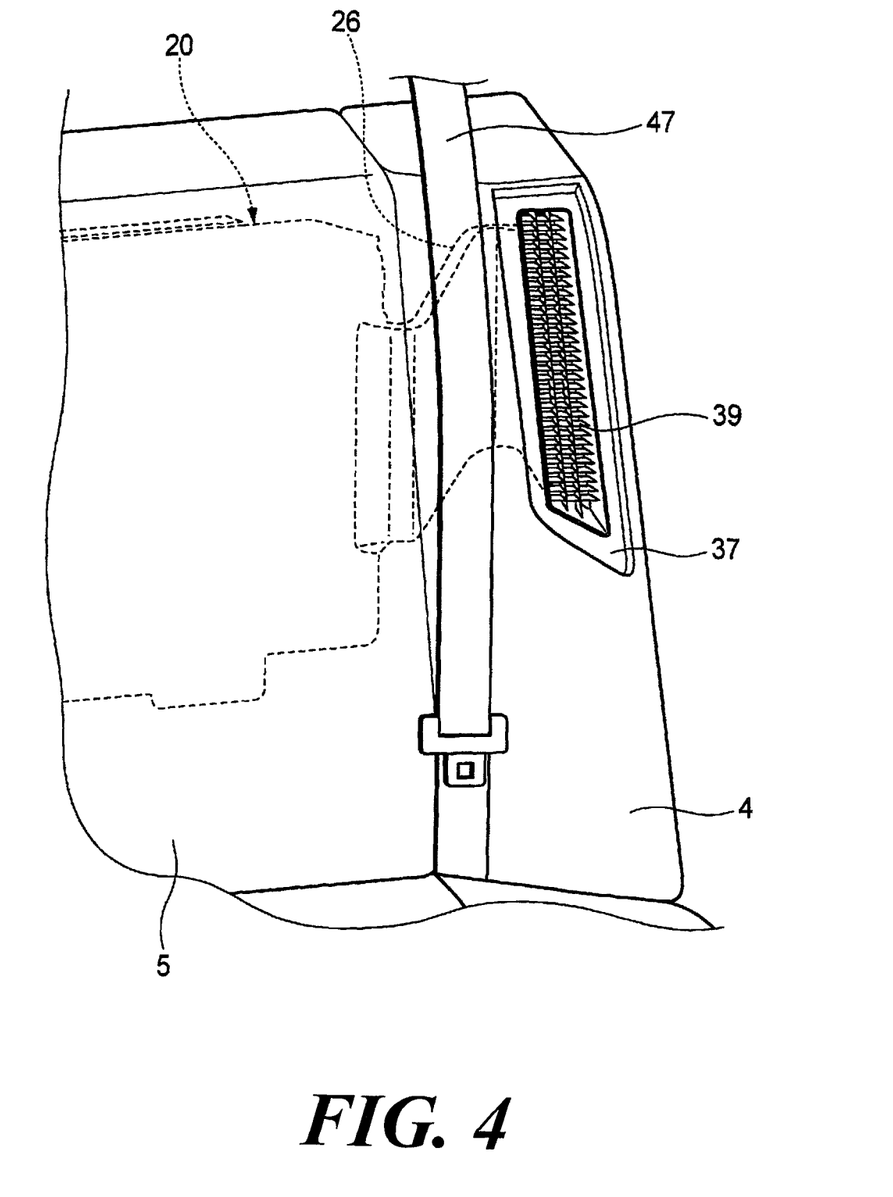
FIG. 4 is a perspective view of a side seatback in which an opening portion is disposed further upwards than a seat cushion of a rear seat.
Figure 5:
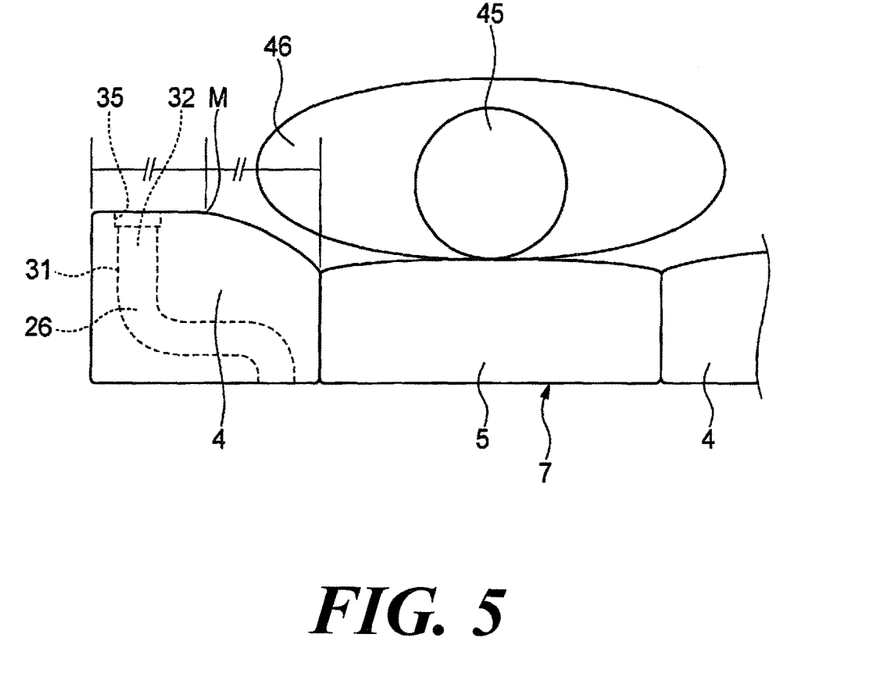
FIG. 5 is a schematic plan view showing a positional relation between a passenger seated in the rear seat and an air inlet passage.

As shown in FIGS. 4 and 5, the air inlet passage 26 is a hollow member having a substantially rectangular section formed of, for example, a synthetic resin, and is bent into a substantially S-shape. The air inlet passage 26 is placed inside the side seatback 4.

Figure 6A:
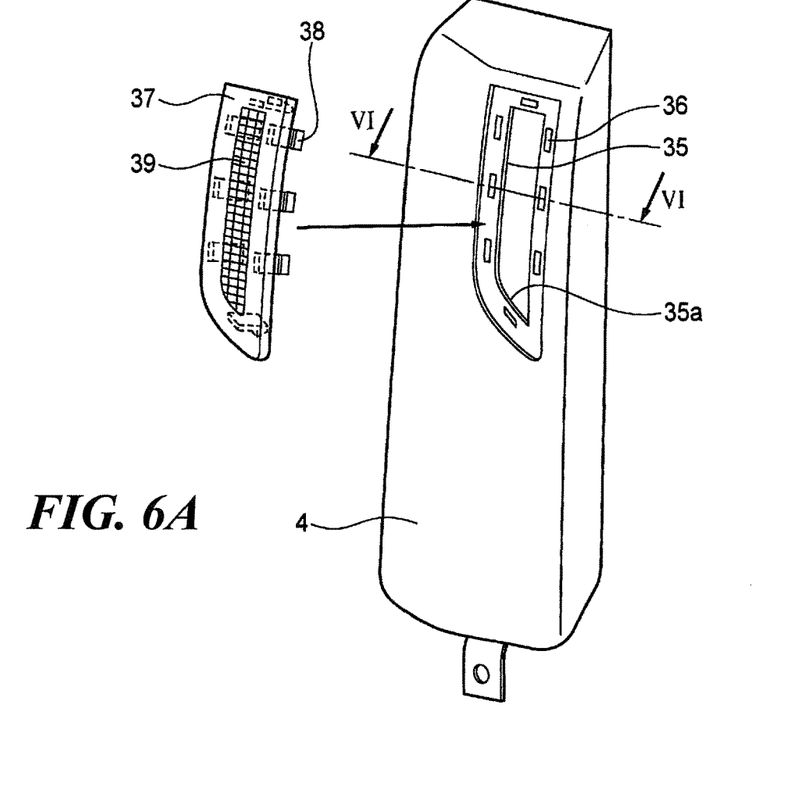
FIG. 6A is a perspective view of an air inlet grille which is mounted at the opening portion.
Figure 6B:
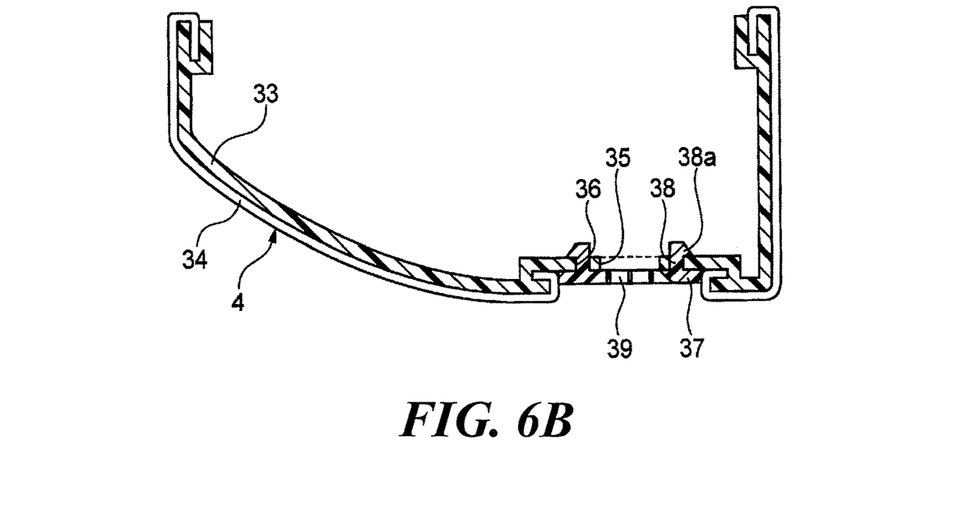
FIG. 6B is a sectional view taken along the line VI-VI of FIG. 6A.

The side seatbacks 4 are vertically elongated cushion portions which are placed on both transversely outer sides of the main seatback 5. When the side seatback 4 is seen from thereabove, a portion of the side seatback 4 which lies further inwards than a transversely intermediate position M thereof is curved so as to gradually project to the front of the vehicle 1 as it goes away from the main seatback 5, while a portion which lies further outwards than the transversely intermediate position M is formed substantially linearly. As shown in FIG. 6B, the side seatback 4 is made up of, for example, a side seatback main body 33 which is formed of a resin and, for example, a skin 34 which is made of a piece of fabric (having air permeability) or leather.

Figure 7:
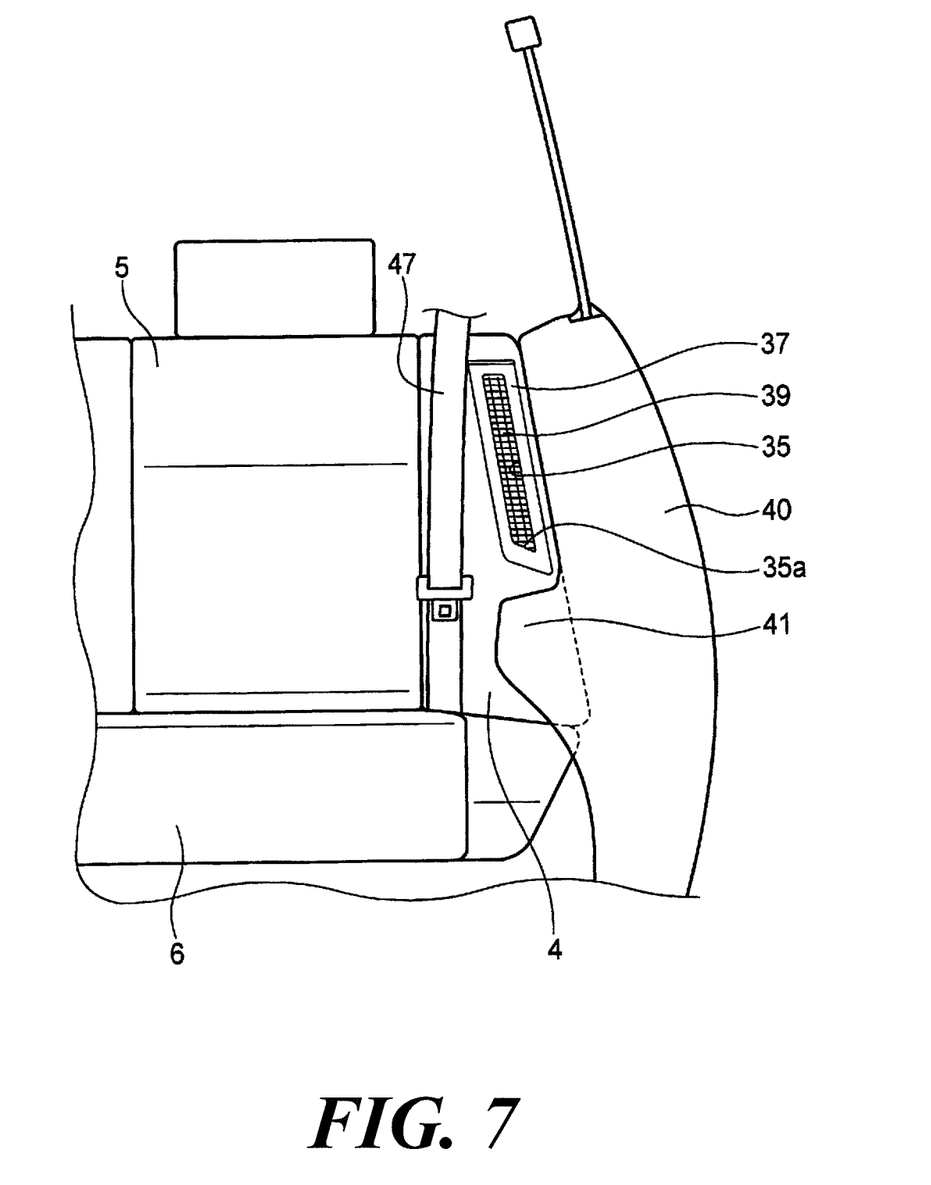
FIG. 7 is a front view of the rear seat in which the opening portion is disposed further upwards than an armrest.

An open end portion 31 of the air inlet passage 26 is disposed further upwards than the seat cushion 6 and extends as upwards as an opening portion 35 provided in the side seatback main body 33. An air inlet port 32 which opens to the open end portion 31 is disposed so as to face the opening portion 35. The opening portion 35 is formed in the substantially linear portion of the side seatback 4 which lies further outwards than the transversely intermediate position M thereof so as not to be closed by the arm or shoulder 46 of a rear seat passenger 45 when he or she leans against the side seatback 4 or by an unfastened seatbelt 47 which is suspended on the side seatback 4. A lower end portion 35a of the opening portion 35 is positioned 30 mm or more higher than an armrest 41 provided on a door lining 40 (refer to FIG. 7) and is gradually inclined upwards as it extends transversely inwards.

The opening portion 35 of the side seatback main body 33 is covered by an air inlet grille 37 having multiple air inlet holes 39 for taking in air from the passenger compartment 9. As shown in FIG. 6A, plural mounting holes 36 are formed in a circumferential edge portion of the opening portion 35 of the side seatback main body 33, while plural mounting legs 38 having substantially L-shaped locking portions 38a are formed on the air inlet grille 37. The air inlet grille 37 is fixed to the side seatback main body 33 by inserting the mounting legs 38 into the mounting holes 36 in the side seatback main body 33 so that the locking portions 38a are brought into engagement with the mounting holes 36.

In the above-described cooling structure, when the cooling fan 30 is caused to rotate, cooling air is taken in from the passenger compartment 9 through the air inlet grille 37 and is then sent from the opening portion 35 in the side seatback 4 to the electric parts box 20 through the air inlet passage 26. Then, the cooling air so taken in cools the battery unit 21, the inverter unit 22 and the DC-DC converter unit 23 and is thereafter discharged through the air outlet passage 27.

According to this embodiment, the opening portion 35 which takes air from the passenger compartment 9 into the air inlet passage 26 is formed in the side seatback 4 which is placed on the transversely outer side of the main seatback 5 of the rear seat 7. Thus, no seat side garnish needs to be provided, and hence, the width of the rear seat 7 can be increased. Thus, air can be sufficiently taken in from the passenger compartment while obtaining a space within the passenger compartment which can provide a superior ride quality. This configuration is effective particularly for a small-sized vehicle in which it is difficult to ensure a space for a seat side garnish. In addition, the contact of the rear seat passenger with the opening portion 35 is prevented when he or she gets in an out of the vehicle 1 by providing the opening portion 35 in the side seatback 4, whereby the rear seat passenger can get in an out of the vehicle 1 comfortably.

The opening portion 35 is disposed transversely outwards than the transversely intermediate position of the side seatback 4, so as not to be closed by the arm or shoulder of the passenger 45 or the unfastened seatbelt 47. Thus, air can be surely taken in from the passenger compartment 9 to be supplied to the electric parts box 20 as cooling air so as to cool the battery unit 21, the inverter unit 22 and the DC-DC converter unit 23.

The lower end portion 35a of the opening portion 35 is positioned 30 mm or more higher than the armrest 41 provided on the door lining 40. Therefore, the elbow of the passenger 45 is not brought into abutment with the opening portion 35, whereby the comfortable space inside the passenger compartment is not deteriorated. Since, the opening portion 35 is not closed by the elbow, air can be surely taken in from the passenger compartment 9.

Since the opening portion 35 is covered by the air inlet grille 37 having many air inlet holes 39, the ingress of foreign matters such as dust from the opening portion 35 can be prevented.

Second Embodiment

Figure 8A:
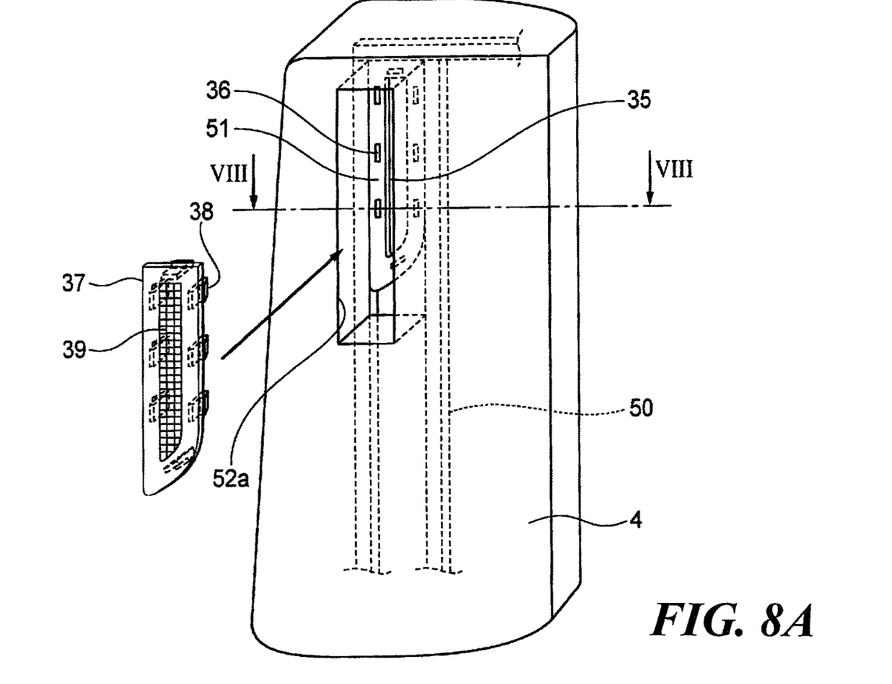
FIG. 8A is a perspective view of a side seatback in which an air inlet grille is mounted from a rear side of a rear seat.
Figure 8B:
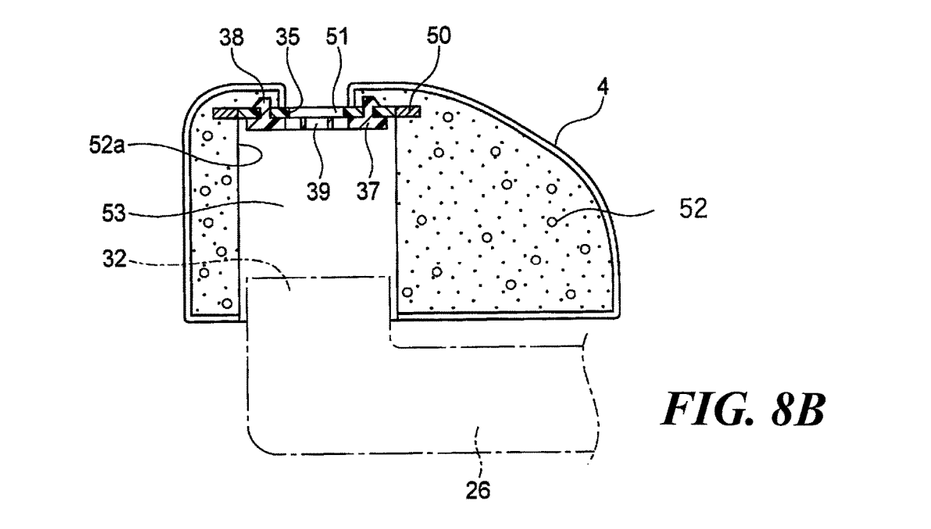
FIG. 8B is a sectional view taken along the line VIII-VIII of FIG. 8A.

FIGS. 8A and 8B show a cooling structure for vehicle high-voltage electric parts according to a second embodiment of the invention. As shown in FIGS. 8A and 8B, an air inlet grille 37 of this embodiment is mounted from a rear side of a side seatback 4. Namely, a cushion material 52 such as a formed urethane resin is filled inside the side seatback 4, and a bracket 51 is fixed to wires 50 which are disposed in the cushion material 52. An opening portion 35 is formed in the bracket 51, and plural mounting holes 36 are formed in a circumferential edge portion of the opening portion 35. The air inlet grille 37 is fixed to the bracket 51 by inserting mounting legs 38 into the mounting holes 36 in the bracket 51 from the rear side of the side seatback 4 through a through hole 52a formed in the cushion material 52 which is provided at least behind the bracket 51 so that locking portions 38a are brought into engagement with the mounting holes 36.

An air inlet port 32 of an air inlet passage 26 are spaced away from the opening portion 35, and a space portion 53 is provided therebetween.

According to this embodiment, the side seatback 4 has the cushion material 52 thereinside which absorbs air inlet noise produced by air taken in from the opening portion 35. Therefore, the air inlet noise can be reduced so as to produce quietness in an interior of a passenger compartment 9.

Since the space portion 53 is provided between the opening portion 35 and the air inlet port 32 of the air inlet passage 26, droplets of water condensed within the air inlet passage 26 is discharged into the space portion 53 so as to prevent the adhesion of water to the battery unit 21, the inverter unit 22 and the DC-DC converter unit 23 which are accommodated in the electric parts box 20, whereby these units 21, 22, 23 can be prevented from being badly affected by the water. By applying the space portion 53 to a portion where it is difficult to provide an air inlet passage 26 capable of introducing a sufficient amount of air, an air inlet line ensuring a required amount of inlet air can be provided within the vehicle 1 when it is compact in size.

In this embodiment, the air inlet port 32 may be disposed close to the opening portion 35 as with the first embodiment without providing the space portion 53 between the air inlet port 32 and the opening portion 35. Thus, the configuration can be altered as required depending on the space where the constituent members can be disposed.

Third Embodiment

Figure 9:
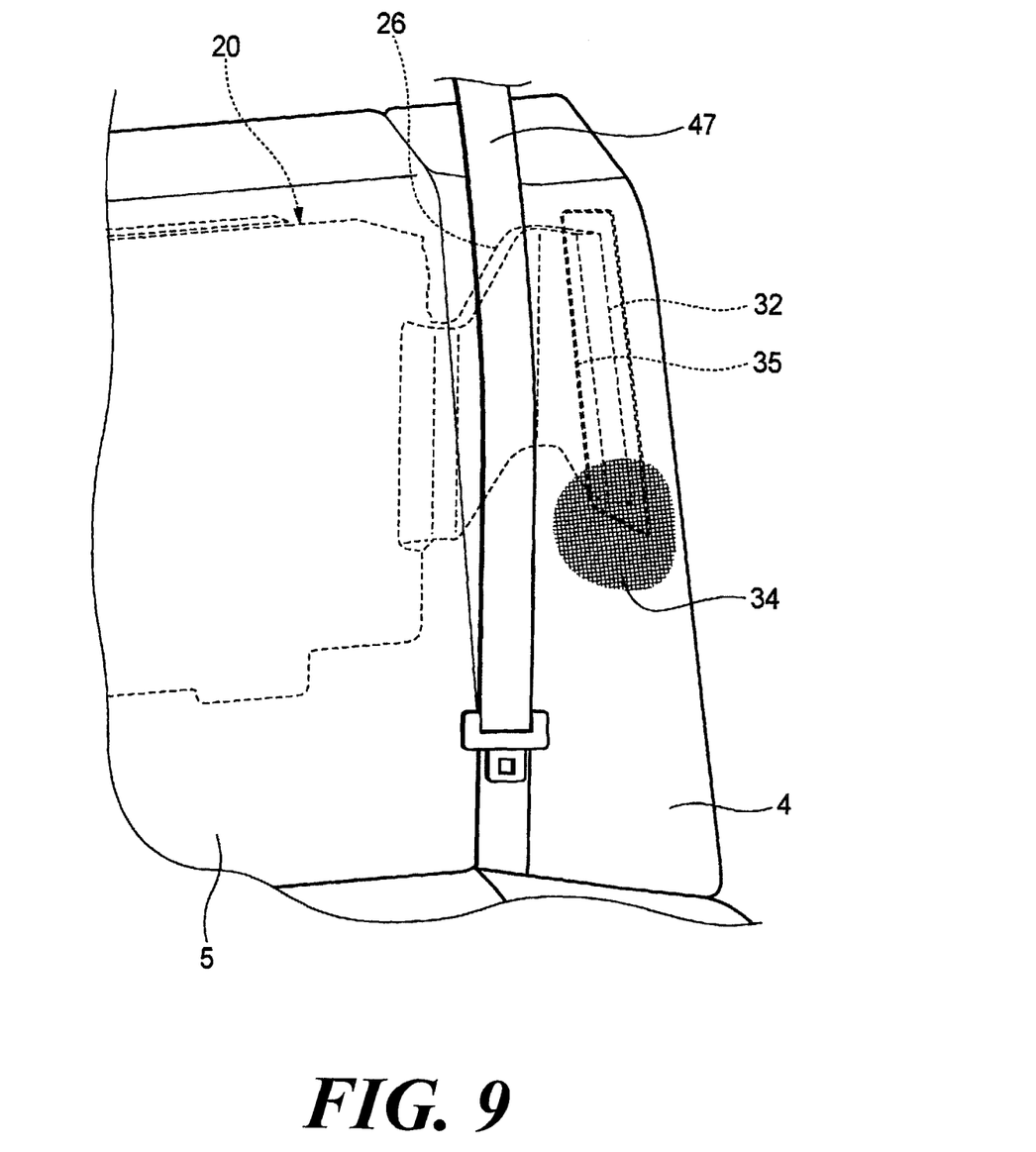
FIG. 9 is a perspective view of a side seatback according to a third embodiment of the invention in which an opening portion is covered by an air-permeable skin.

FIG. 9 shows a cooling structure for vehicle high-voltage electric parts according to a third embodiment. In this embodiment, a side seatback 4 includes no air inlet grille. A whole surface of the side seatback 4 which includes an opening portion 35 is covered uniformly by an air-permeable skin 34 such as a fabric. Thus, the whole of the side seatback 4 is covered by the same skin 34, thereby giving a look of an integral side seatback 4 and enhancing the product quality thereof. In addition, the air inlet noise can be reduced by the air-permeable skin 34, whereby a quiet passenger compartment is obtained.

The opening portion 35 may have a grid-like configuration so that the skin 34 is not depressed largely when a rear seat passenger 45 contacts the opening portion 35 via the skin 34. Thus, an air inlet grille 37 may be mounted inside the skin 34.

Fourth Embodiment

Figure 10:
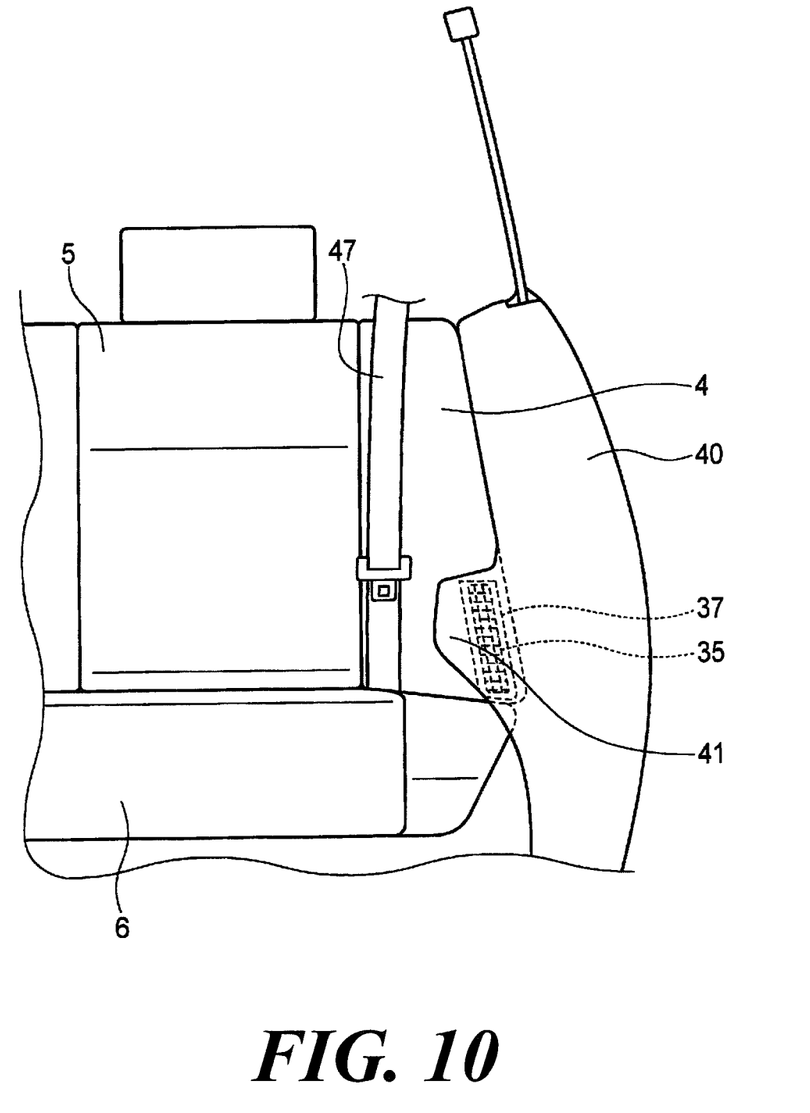
FIG. 10 is a front view of a fourth embodiment of the invention as seen from the front in which an opening portion is disposed so as to overlap an armrest.

FIG. 10 shows a cooling structure for vehicle high-voltage electric parts according to a fourth embodiment of the invention. As shown in FIG. 10, an opening portion 35 (an air inlet grille 37) of this embodiment is disposed so that at least part thereof is concealed by an armrest 41 provided on a door lining 40 when viewed from the front thereof. Thus, the ingress of foreign matters such as dust from the opening portion 35 can be prevented. Since the opening portion 35 is made inconspicuous by the armrest 41, the interior design quality can be enhanced. Since the opening portion 35 will not be closed by a rear seat passenger 45, a sufficient amount of inlet air can be ensured so as to cool the high-voltage electric parts effectively.

The invention is not limited to the above-described embodiments but can be altered, modified or improved as required. The embodiments can be combined as required without departing from the spirit and scope of the invention. While the hybrid vehicle is exemplified in the embodiments, the invention is not limited thereto. For example, the invention may be applied to an electric vehicle which employs a motor or motors as a drive source.

Figure 11:
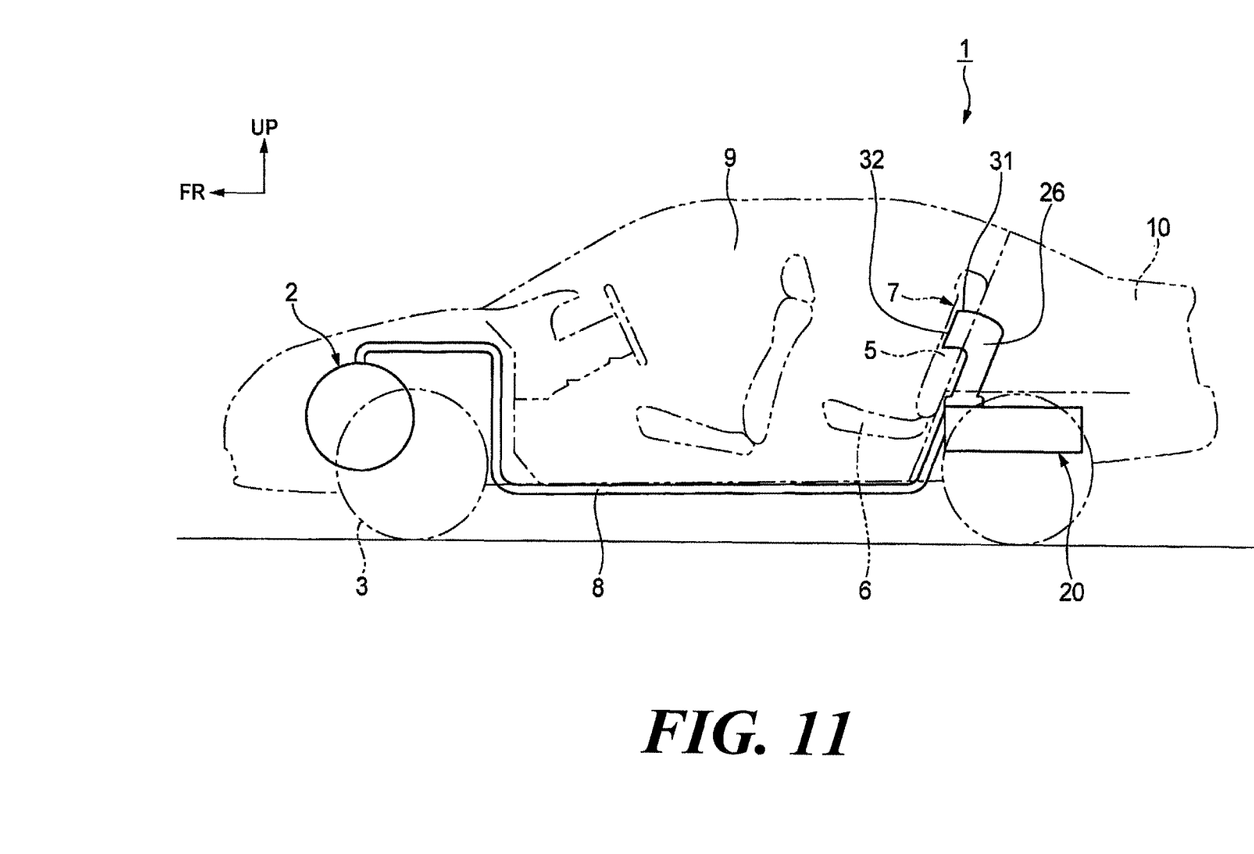
FIG. 11 is a schematic side view of a hybrid vehicle according to a modified example of the invention.

In the embodiments, while the electric parts box 20 is described as being disposed behind the main seatback 5 of the rear seat 7, as shown in FIG. 11, the electric parts box 20 may be disposed underneath a floor of a luggage space 10 provided behind the rear seat 7. In this case, the air inlet passage 26 may be caused to extend downwards so as to communicate with the high-voltage electric parts (the electric parts box 20).

The invention is based on Japanese Patent Application (No. 2009-180967) filed on Aug. 3, 2009, the contents of which are incorporated herein by reference.

DESCRIPTION OF REFERENCE NUMERALS 1 vehicle; 4 side seatback; 5 main seatback; 6 seat cushion; 7 rear seat; 9 passenger compartment; 20 electric parts box; 21 battery unit (high-voltage electric part); 22 inverter unit (high-voltage electric part); 23 DC-DC converter unit (high-voltage electric part); 26 air inlet passage; 30 cooling fan; 32 air inlet port; 34 skin; 35 opening portion; 35a lower end portion; 37 air inlet grille; 39 air inlet hole; 40 door lining; 41 armrest; 52 cushion material; 53 space portion.

The invention claimed is:

1. A cooling structure for vehicle high-voltage electric parts which are disposed behind a rear seat, comprising:
an air inlet passage having an air inlet port which is disposed higher than a seat cushion of the rear seat and communicating with the high-voltage electric parts so as to supply an air inside a passenger compartment to the high-voltage electric parts to cool the high-voltage electric parts; and
a cooling fan which causes the air inside the passenger compartment to flow,
wherein a side seatback is disposed transversely outward of a main seatback of the rear seat, the side seatback comprising:
a transversely inward portion which lies transversely inwards from a transversely central position of the side seatback and which is curved so as to gradually project to a front of a vehicle as it goes away from the main seatback; and
a transversely outward portion which lies transversely outwards from the transversely central position of the side seatback and which is formed substantially linearly,
wherein an opening portion for taking in the air inside the passenger compartment into the air inlet passage opens toward the front of the vehicle in the substantially-linear transversely outward portion of the side seatback, and
wherein a seatbelt in an unfastened state is disposed on the curved transversely inward portion of the side seatback.

2. The structure of claim 1,
wherein a lower end portion of the opening portion is positioned 30 mm or more higher than an armrest which is provided on a door lining.

3. The structure of claim 2,
wherein the opening portion is covered by a skin of the side seatback which has an air-permeability.

4. The structure of claim 2,
wherein the opening portion is covered by an air inlet grille having multiple air inlet holes.

5. The structure of claim 2,
wherein the side seatback has a cushion material, so that air inlet noise of the air which is taken in from the opening portion is absorbed by the cushion material.

6. The structure of claim 1,
wherein the opening portion is disposed so that at least part thereof is concealed by an armrest which is provided on a door lining when viewed from the front of the vehicle.

7. The structure of claim 6,
wherein the opening portion is covered by a skin of the side seatback which has an air-permeability.

8. The structure of claim 6,
wherein the opening portion is covered by an air inlet grille having multiple air inlet holes.

9. The structure of claim 6,
wherein the side seatback has a cushion material, so that air inlet noise of the air which is taken in from the opening portion is absorbed by the cushion material.

10. The structure of claim 1,
wherein the opening portion is covered by a skin of the side seatback which has an air-permeability.

11. The structure of claim 10,
wherein the side seatback has a cushion material, so that air inlet noise of the air which is taken in from the opening portion is absorbed by the cushion material.

12. The structure of claim 1,
wherein the opening portion is covered by an air inlet grille having multiple air inlet holes.

13. The structure of any of claim 1,
wherein the side seatback has a cushion material, so that air inlet noise of the air which is taken in from the opening portion is absorbed by the cushion material.

14. The structure of claim 1,
wherein a space portion is provided between the opening portion and the air inlet port of the air inlet passage.

15. The structure of claim 1,
wherein the opening portion is disposed so that at least part thereof is concealed by an armrest when viewed from the front thereof.

16. The structure of claim 1,
wherein the opening portion is covered by an air inlet grille having multiple air inlet holes.

17. The structure of claim 1,
wherein the side seatback has a cushion material, so that air inlet noise of the air which is taken in from the opening portion is absorbed by the cushion material.

* * * * *